(12) United States Patent
Jung et al.

(10) Patent No.: US 8,774,807 B2
(45) Date of Patent: Jul. 8, 2014

(54) METHOD OF PERFORMING HANDOVER IN MULTI CARRIER WIRELESS ACCESS SYSTEM

(75) Inventors: Soojung Jung, Daejeon (KR); Juhee Kim, Daejeon (KR); Eunkyung Kim, Seoul (KR); Jae Sun Cha, Daejeon (KR); Kwang Jae Lim, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 666 days.

(21) Appl. No.: 12/769,235

(22) Filed: Apr. 28, 2010

(65) Prior Publication Data

US 2010/0285831 A1    Nov. 11, 2010

(30) Foreign Application Priority Data

Apr. 28, 2009 (KR) .................. 10-2009-0037201
Apr. 28, 2010 (KR) .................. 10-2010-0039353

(51) Int. Cl.
*H04W 4/00* (2009.01)

(52) U.S. Cl.
USPC ........................ 455/436; 370/329; 370/331

(58) Field of Classification Search
USPC ........ 455/436, 524, 456.6, 456.3, 456.5, 458, 455/422.1, 432.1–455, 550.1, 552.1, 553.1, 455/556.1, 556.2; 370/312, 328, 315, 335
See application file for complete search history.

(56) References Cited

U.S. PATENT DOCUMENTS

| | | | |
|---|---|---|---|
| 7,519,368 B2 * | 4/2009 | Lim et al. ...................... 455/436 |
| 2007/0086388 A1 * | 4/2007 | Kang et al. ................... 370/331 |
| 2007/0218896 A1 * | 9/2007 | Altshuller et al. ......... 455/432.1 |
| 2009/0310563 A1 * | 12/2009 | Chou et al. ................... 370/331 |
| 2010/0027494 A1 * | 2/2010 | Kwon et al. .................. 370/329 |
| 2010/0260142 A1 * | 10/2010 | Jung et al. .................... 370/331 |
| 2010/0272067 A1 * | 10/2010 | Lu et al. ....................... 370/331 |
| 2011/0149912 A1 * | 6/2011 | Jung et al. .................... 370/331 |

FOREIGN PATENT DOCUMENTS

KR    10-2008-0087370    10/2008

* cited by examiner

*Primary Examiner* — Claire X Pappas
*Assistant Examiner* — Ngan Pham Lu
(74) *Attorney, Agent, or Firm* — Staas & Halsey LLP

(57) ABSTRACT

There is provided a method for handover of a terminal in a wireless access system using multi-carrier operation. The method comprises: receiving a handover command message from a serving base station; and performing network reentry to a target base station based on the handover command message, wherein the handover command message includes information required for handover to the target base station and information on whether the target base station supports handover using multi-carriers. Accordingly, it is possible to efficiently perform the handover in the wireless access system supporting the multi-carriers.

19 Claims, 5 Drawing Sheets

METHOD OF PERFORMING HANDOVER IN MULTI CARRIER WIRELESS ACCESS SYSTEM

This application claims priority to and the benefit of Korean Patent Application Nos. 10-2009-0037201 and 10-2010-0039353 filed in the Korean Intellectual Property Office on Apr. 28, 2009 and Apr. 28, 2010, the entire contents of which are incorporated herein by reference.

BACKGROUND OF THE INVENTION (a) Field of the Invention

The present invention relates to a wireless access system. More particularly, the present invention relates to a method of performing handover in a wireless access system supporting multi-carrier operation.

(b) Description of the Related Art

At present, research on wireless access systems supporting multi-carriers (MC) is actively under way. A multi-carrier operation allows for more efficient communication compared to a single-carrier operation. For instance, a terminal can use a wider bandwidth, and a base station can serve more users.

In a general multi-carrier operation, two types of carriers, i.e., a primary carrier and a secondary carrier are defined. The primary carrier means a carrier for transmitting and receiving data and a control message between a terminal and a base station. The primary carrier can be used for control and management of the terminal by base station, such as network entry. The secondary carrier means an additional carrier that can be used for data transmission and reception based on the control message transmitted through the primary carrier. The terminal is controlled through the primary carrier, which is one of multi-carriers, and can dynamically use one or more of secondary carriers for data transmission and reception.

The multi-carriers are identified by physical carrier indexes between the base station and the terminal, and can be identified additionally by a logical carrier indexes when they are being used for data transmission and reception. The physical carrier index is the index of a carrier that can be used for the base station.

When a terminal wants to move out of a coverage area of a serving base station with which the terminal is currently in communication and enters a coverage area of another base station, a communication path is changed to a target base station to maintain communication. This procedure is called "handover". A method of performing handover using multi-carriers has a problem in that a method of performing handover using a single carrier cannot be applied as it is. For instance, the terminal does not know whether the target base station supports multi-carriers and which one of the multi-carriers can be used in order to communicate with the corresponding target base station. Accordingly, there is a need to define a new method of performing handover using multi-carriers.

SUMMARY OF THE INVENTION

The present invention has been made in an effort to provide a method of performing handover in a wireless access system supporting multi-carrieroperation.

One exemplary embodiment of the present invention provides a method of performing handover of a terminal in a wireless access system supporting multi-carrier operation, the method comprising: receiving a handover command message from a serving base station; and performing network reentry to a target base station based on the handover command message, wherein the handover command message comprises information required for handover to the target base station and information on whether the target base station supports handover using multi-carriers.

Another exemplary embodiment of the present invention provides a method for handover of a terminal in a wireless access system supporting multi-carriers, the method comprising: receiving a request to perform a handover procedure using multi-carriers from a serving base station through a handover command message including carrier information of a target base station; and performing network reentry to the target base station.

One exemplary embodiment of the present invention provides a method of performing handover of a serving base station in a wireless access system supporting multi-carriers, the method comprising: negotiating with a target base station for handover; and transmitting a handover command message including information on whether the target base station supports handover using multi-carriers based on a result of the negotiating to a terminal.

One exemplary embodiment of the present invention provides an apparatus for controlling the handover of a terminal in a wireless access system supporting multi-carriers, the apparatus comprising: a transceiver unit for receiving a handover command message from a serving base station; and a processor for performing network reentry to a target base station based on the handover command message, wherein the handover command message comprises information required for handover to the target base station and information on whether the target base station supports handover using multi-carriers.

It is possible to efficiently perform handover in a wireless access system supporting multi-carriers. Particularly, if handover is performed using the multi-carriers, the handover can be performed without interruption in data transmission and reception between the serving base station and the terminal during the handover period.

DETAILED DESCRIPTION OF THE EMBODIMENTS

Figure 1:
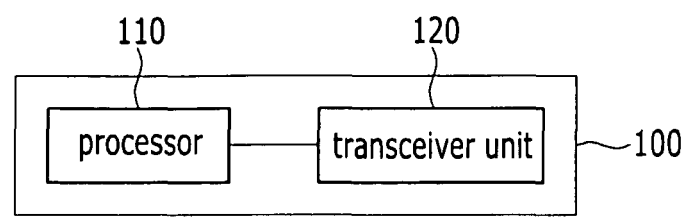
FIG. 1 is a block diagram schematically showing an apparatus for controlling handover of a terminal in a wireless access system supporting multi-carriers according to one exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this specification, a mobile station (MS) may designate a terminal, a mobile terminal (MT), a subscriber station (SS), a portable subscriber station (PSS), user equipment (UE), an access terminal (AT), and so on. Moreover, the mobile station may include all or a part of functions of the terminal, the mobile terminal, the subscriber station, the portable subscriber station, the user equipment, the access terminal and so on.

In this specification, a base station (BS) may designate an access point (AP), a radio access station (RAS), a node B (Node B), an evolved node B (eNode B), a base transceiver station (BTS), a mobile multihop relay (MMR)-BS, an advanced BS (ABS), and so on. Further, the base station may include all or a part of functions of the access point, the radio access station, the node B, the eNode B, the base transceiver station, the MMR-BS, and so on.

FIG. 1 is a block diagram schematically showing an apparatus for controlling handover of a terminal in a wireless access system supporting multi-carrier operation according to one exemplary embodiment of the present invention.

Referring to FIG. 1, a handover control apparatus 100 includes a processor 110 and a transceiver unit 120.

The transceiver unit 120 transmits a handover request message to a serving base station, and receives a handover command message from the serving base station.

The processor 110 sets the handover request message including information about whether the terminal wants to perform handover using multi-carriers. Then, the processor 110 is configured to perform network reentry to a target base station based on information included in the handover command message. The handover command message includes information to handover to the target base station and information about whether the target base station supports handover using multi-carriers.

Hereinafter, a handover procedure using multi-carriers will be described.

Before initiating the handover procedure, the terminal receives an advertisement message including system information of neighboring base stations, for example, an AAI_NBR-ADV (Advanced Air Interface_Neighbor-Advertisement) message from the serving base station. The AAI_NBR-ADV message is periodically broadcast by the serving base station. Alternately, the terminal transmits a scanning request message (Advanced Air Interface_Scanning-Request, AAI_SCN-REQ) requesting scanning of the neighboring base stations to the serving base station, the base station transmits a scanning response message (Advanced Air Interface_Scanning-Response, AAI_SCN-RSP) to the terminal, and the terminal transmits a scanning report message (Advanced Air Interface_Scanning-Report, AAI_SCN-REP) reporting a scanning result to the serving base station. If the terminal transmits and receives data using multi-carriers, the terminal can communicates with the serving base station using a part of the multi-carriers and scan the neighboring base stations using the remaining part of the multi-carriers. To this end, the scanning request message, the scanning response message, and the scanning report message may include information about a carrier associated with scanning. The information about the carrier associated with scanning may be indicated by a physical carrier index. Moreover, the AAI_NBR-ADV message or the scanning response message may further include information about the multi-carriers of the neighboring base stations. The information about the multi-carriers of the neighboring base stations may include a physical carrier index that can be used by the neighboring base stations.

Figure 2:
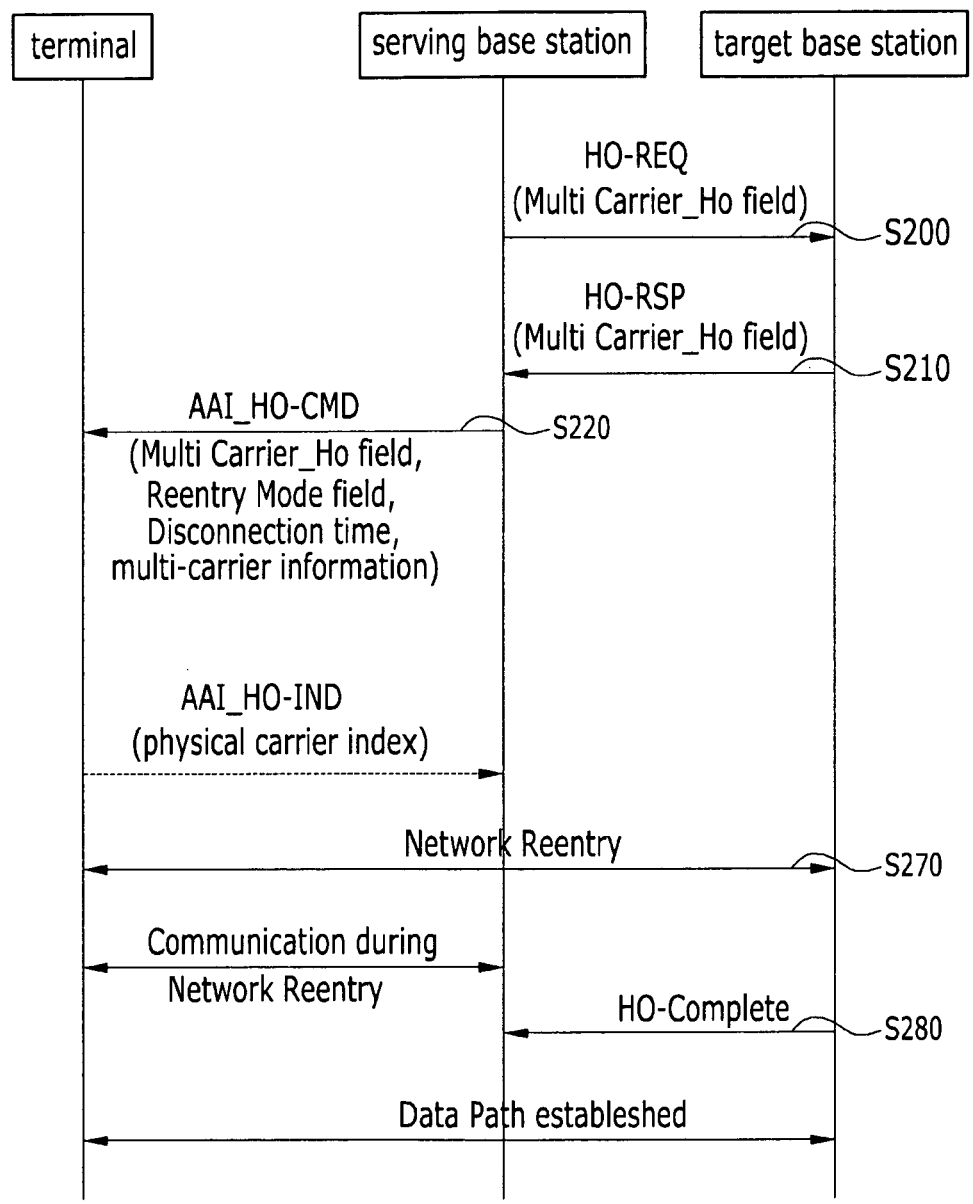
FIGS. 2 and 3 are flowcharts showing a method of performing handover in a wireless access system supporting multi-carriers according to one exemplary embodiment of the present invention.
Figure 3:
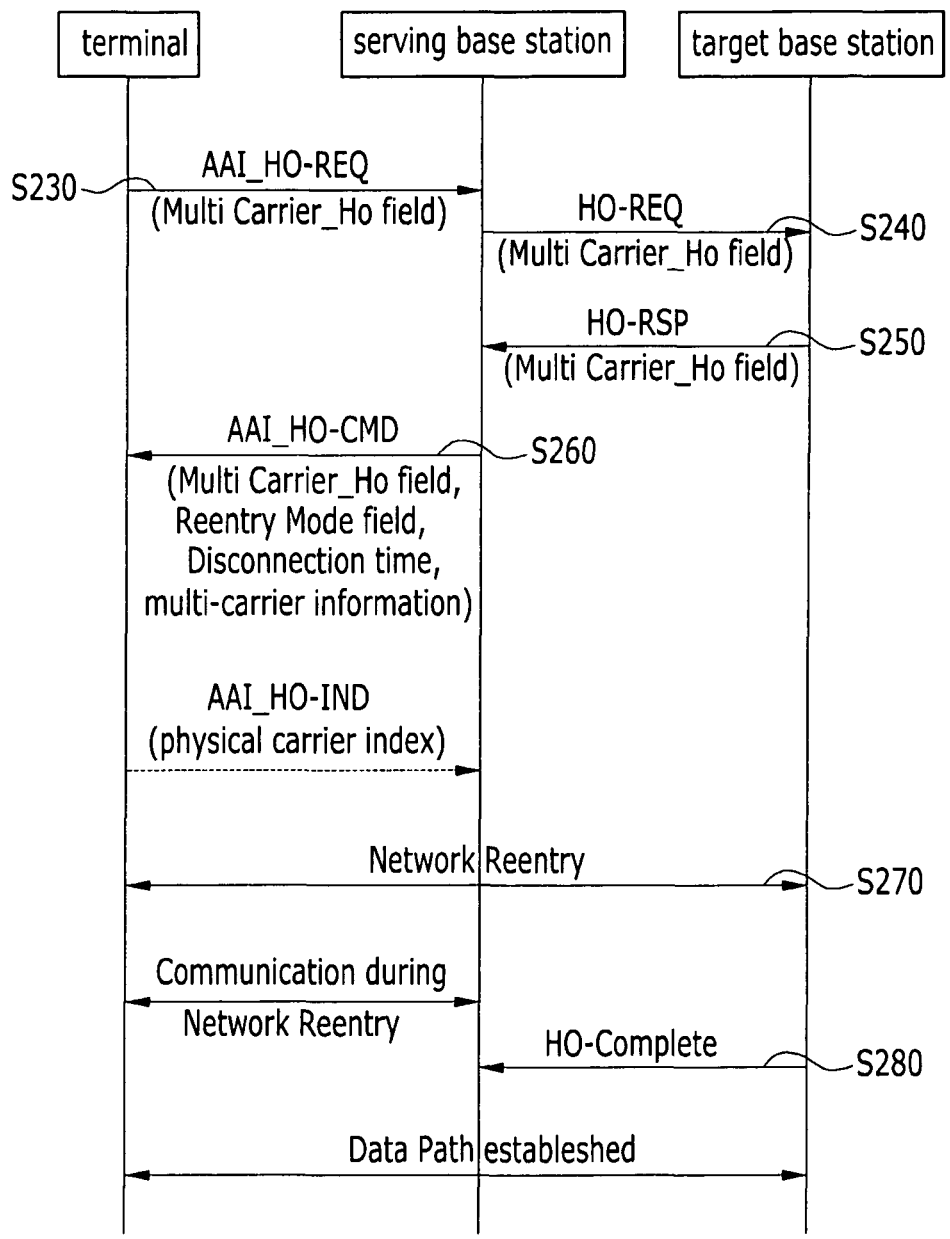

FIGS. 2 and 3 are flowcharts showing a method of performing handover in a wireless access system supporting multi-carrier operation according to one exemplary embodiment of the present invention. FIG. 2 shows a case where a serving base station initiates handover, and FIG. 3 shows a case where a terminal initiates handover.

Referring to FIG. 2, the serving base station transmits a handover request (HO-REQ) message including information about the terminal to a target base station (S200). The number of target base stations may be more than one. If the terminal supports multi-carrier operation, the serving base station checks whether the target base station supports handover using multi-carriers (hereinafter, multi-carrier_handover (Multi-Carrier_HO)). To this end, the serving base station may allow the HO-REQ message to include a multi-carrier_handover information field (hereinafter, Multi-Carrier_HO field) representing a multi-carrier_handover support.

The target base station having received the HO-REQ message transmits a handover response (HO-RSP) message to the serving base station (S210). If the HO-REQ message includes the Multi-Carrier_HO field, the target base station may transmit the HO-RSP message indicated whether it supports the multi-carrier_handover in the Multi-Carrier_HO field. If the target base station supports the multi-carrier_handover, the HO-RSP message may further include an information field of a carrier associated with the handover. The serving base station and the target base station can transmit and receive the HO-REQ message and the HO-RSP message by using a backbone.

The serving base station performed handover negotiation with the target base station through the HO-REQ message and HO-RSP message transmits a handover command (Advanced Air Interface_Handover-Command, AAI_HO-CMD) message to the terminal (S220). The handover command message includes handover information for the target base station. The handover information includes information about the multi-carrier_handover support of the target base station. That is, the serving base station can transmit the handover command message by indicating in the Multi-carrier_HO field whether the target base station supports the multi-carrier_handover.

The handover command message may further include a Reentry_Mode field. The Reentry_Mode field is a field for allowing the terminal to communicate with the serving base station while performing network reentry to the target base station. If both of the Multi-Carrier_HO field and the Reentry_Mode field of the handover command message are indicated, the terminal capable of transmitting and receiving data using multi-carriers can communication with the serving base station by using a part of the carriers and perform network reentry to the target base station by using the remaining part of the carriers.

The handover command message may further include a Disconnect_time value. The Disconnect_time value represents a time at which the serving base station stops resource allocation to the terminal. The serving base station sets the Disconnect_time to a value that is sufficient for the terminal to perform successful network reentry to the target base station.

The handover command message may further include multi-carrier information about the target base station. The multi-carrier information about the target base station refers to multi-carrier information that the terminal can use in the target base station. The multi-carrier information about the target base station can be indicated by a physical carrier index. If there is a plurality of target base stations, the handover command message may include multi-carrier information about each target base station. In addition, the handover command message may further include carrier information about the serving base station. This is to avoid resource allocation on those carriers while the corresponding carriers are performing network reentry to the target base station. If a transmission and negotiation of all the information for multi-carrier_handover are done in a handover negotiation process (steps S200 and S210) between the serving base station and the target base station, the handover command message can further include multi-carrier information about the target base station such as a logical carrier index.

The handover command message may further include an Action Time value. The Action Time value refers to a time at which the terminal performs a network reentry procedure. In one example, the Action Time value may be set for each carrier or for each target base station. In another example, the Action Time value may be a fixed value.

Referring to FIG. 3, a terminal transmits a handover request (AdvancedAirinterface_Handover-Request, AAI_HO-REQ) message to a serving base station (S230). The handover request message further includes a Multi-Carrier_HO field. If the terminal wants to perform handover using multi-carriers, it can transmit to the serving base station a handover request (AAI_HO-REQ) message with the Multi-Carrier_HO field set to a value.

When the serving base station receives the handover request (AAI_HO-REQ) message from the terminal, the serving base station checks the Multi-Carrier_HO field. If the Multi-Carrier_HO field isset, the serving base station negotiate with target base station as to whether a target base station supports multi-carrier_handover. That is, the serving base station transmits a handover request message (HO-REQ) including the Multi-Carrier_HO field set to the target base station (S240). Afterwards, the steps S250 and S260 are the same as the steps S210 and S220, so a repeated description thereof will be omitted.

Referring to FIGS. 2 and 3, the terminal having received the handover command message with Multi-carrier_HO and Reentry Mode from the serving base station maintains communication with the serving base station by using a part of the carriers, and performs network reentry to the target base station by using the remaining part of the carriers (S270). The terminal can transmit a handover indication (AAI_HO-IND) message to the serving base station before the step S270. The handover indication message includes carrier information that the terminal uses to perform network reentry to the target base station, which prevents the serving base station from allocating resources to the corresponding carrier.

If network reentry to the target base station is successful, the target base station transmits a handover complete message to the serving base station (S280). The serving base station having received the handover complete message deletes information about the terminal, and, if necessary, forwards it to the target base station. Thereafter, a data path is established between the terminal and the target base station.

Figure 4:
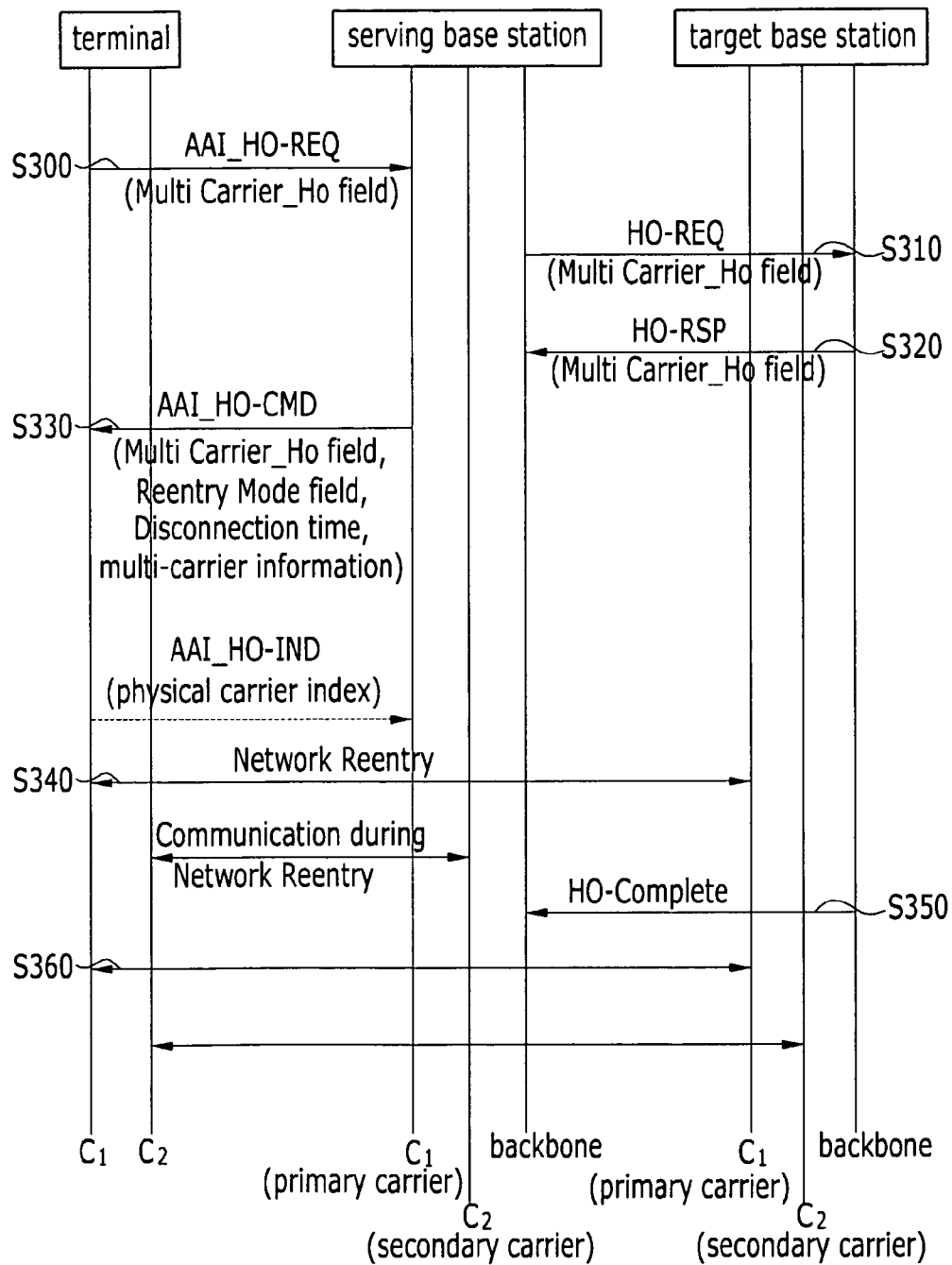
FIGS. 4 and 5 are flowcharts showing a method of performing handover using multi-carriers according to one exemplary embodiment of the present invention.
Figure 5:
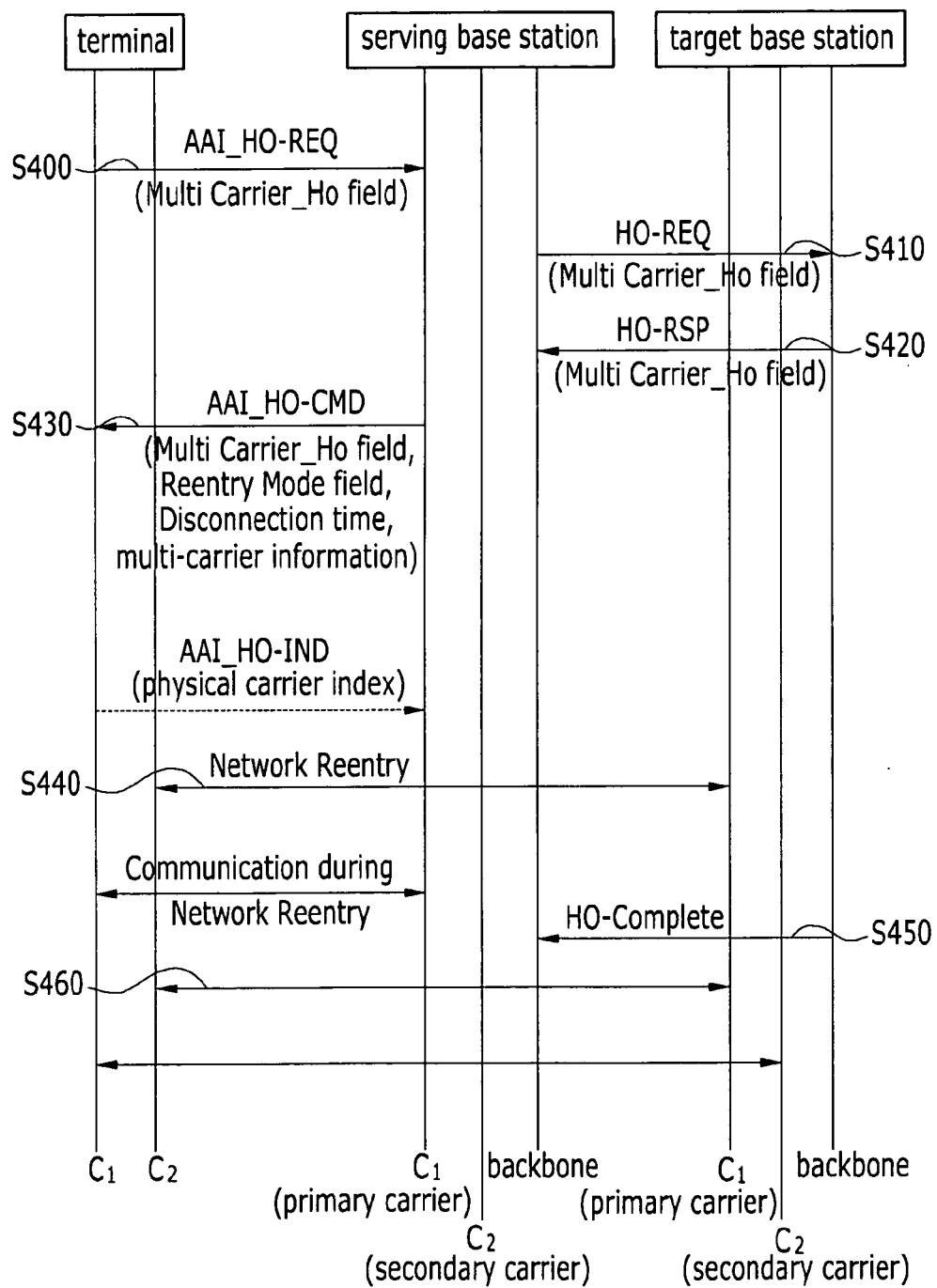

FIGS. 4 and 5 are flowcharts showing a method of performing handover using multi-carriers according to one exemplary embodiment of the present invention. For better comprehension and ease of description, although illustration has been given for a case where a terminal initiates handover, the same applies when a base station initiates handover.

Referring to FIGS. 4 and 5, a terminal transmits a handover request (AAI_HO-REQ) message including a Multi-Carrier_HO field to a serving base station (S300 and S400). There is an assumption that it is indicated in the Multi-Carrier_HO field that the terminal performs handover using multi-carriers.

The serving base station transmits a HO-REQ message including the Multi-Carrier_HO field set to a target base station to inquire whether the target base station supports multi-carrier_handover (S310 and S410), and the target base station transmits a HO-RSP message including the Multi-Carrier_HO field to the serving base station to response whether the target base station supports the multi-carrier_handover (S320 and S420). If the target base station supports the multi-carrier_handover, this can be indicated in the Multi-Carrier_HO field. The HO-RSP message may further include information about which carrier of the target base station is associated with the multi-carrier_handover. A handover negotiation through transmitting and receiving the HO-REQ message and the HO-RSP message between the serving base station and the target base station can be done by using a backbone.

After performing the handover negotiation with the target base station, the serving base station transmits a handover command message including the Multi-Carrier_HO field to the target base station (S330 and S430). The handover command message may further include a Reentry Mode field, a Disconnect Time value, multi-carrier information of the target base station, and carrier information of the serving base station used for network reentry.

The terminal performs network reentry to the target base station based on the handover command message (S340 and S440). If the Multi-Carrier_HO field of the handover command message is set, the corresponding target base station supports multi-carrier_handover. Thus, the terminal performs network reentry based on the multi-carrier_handover. If both of the Multi-carrier_HO field and the Reentry_Mode field of the handover command message are set, the terminal performs communication with the serving base station by using a part of the carriers and performs network reentry to the target base station by using the remaining part of the carriers.

Based on the multi-carrier information of the target base station and the serving base station included in the handover command message, if it is determined that the carrier used for the network reentry to the target base station is equal to a primary carrier of the serving base station, network reentry is performed as in the step S340 of FIG. 4. That is, network reentry is performed through some carrier C1 of the terminal and a primary carrier C1 of the target base station, and communication is performed through the remaining carrier C2 of the terminal and a secondary carrier C2 of the serving base station. On the contrary, if it is determined that the carrier used for the network reentry to the target base station is not equal to the primary carrier of the serving base station, network reentry is performed as in the step S440 of FIG. 5. That is, network reentry is performed through some carrier C2 of the terminal and the primary carrier C1 of the target base station, and communication is performed through the remaining carrier C1 of the terminal and the primary carrier C1 of the serving base station.

If the network reentry to the target base station is successful, the target base station transmits a handover complete message to the serving base station (S350 and S450), and a data path is established between the terminal and the target base station (S360 and S460).

The exemplary embodiments of the present invention described above are not only implemented by the method and apparatus, but it may be implemented by a program for executing the functions corresponding to the configuration of the exemplary embodiment of the present invention or a recording medium having the program recorded thereon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of performing handover of a terminal in a wireless access system supporting multi-carrier operation, the method comprising:
receiving a handover command message from a serving base station; and
performing network reentry to a target base station based on the handover command message,
wherein the handover command message received from the serving base station comprises information required for handover to the target base station and information on whether the target base station supports handover using multi-carriers and a physical carrier index of the target base station.

2. The method of claim 1, further comprising transmitting a handover request message to the serving base station before receiving the handover command message,
wherein the handover request message comprises information about whether the terminal wants to perform the handover using multi-carriers.

3. The method of claim 1, wherein the handover command message further comprises information representing whether the terminal communicates with the serving base station while performing the network reentry.

4. The method of claim 1, wherein the handover command message comprises carrier information of the serving base station used for network reentry to the target base station and multi-carrier information of the target base station.

5. The method of claim 1, wherein the receiving of the handover command message comprises receiving the handover command message through a primary carrier among the multi-carriers of the terminal, and
performing the network reentry through the primary carrier.

6. The method of claim 5, further comprising communicating with the serving base station through a secondary carrier among the multi-carriers of the terminal while performing the network reentry.

7. The method of claim 6, wherein the communicating further comprises performing communication through the secondary carrier among the terminal and a secondary carrier of the serving base station.

8. The method of claim 1, wherein the receiving of the handover command message comprises receiving the handover command message through a primary carrier among the multi-carriers of the terminal, and
performing the network reentry through a secondary carrier among the multi-carriers of the terminal.

9. The method of claim 8, further comprising communicating with the serving base station through the primary carrier while performing the network reentry.

10. The method of claim 9, wherein the performing of communication further comprises performing communication through the primary carrier and a primary carrier of the serving base station for the terminal.

11. A method for handover of a terminal in a wireless access system supporting multi-carrier operation, the method comprising:
receiving a request to perform a handover procedure using multi-carriers from a serving base station through a handover command message including carrier information of a target base station; and
performing network reentry to the target base station,
wherein the handover command message comprises a physical carrier index of the target base station.

12. The method of claim 11, wherein the handover command message further comprises information on a Disconnect_Time, and the Disconnect_Time is long enough to complete the network reentry to the target base station before expiration of the Disconnect_Time.

13. The method of claim 11, further comprising transmitting a handover indication message including the carrier information used to perform the network reentry to the serving base station.

14. A method of performing handover of a serving base station in a wireless access system supporting multi-carrier operation, the method comprising:
negotiating with a target base station for handover; and
transmitting a handover command message including information on whether the target base station supports handover using multi-carriers based on a result of the negotiating to a terminal,
wherein the handover command message comprises a physical carrier index of the target base station.

15. The method of claim 14, wherein the negotiating for handover comprises:
transmitting a first message inquiring whether the target base station supports handover using multi-carriers to the target base station; and
receiving a second message in response to the first message.

16. The method of claim 15, wherein, if the target base station supports the handover using multi-carriers, the second message further comprises information on the carrier associated with the handover.

17. The method of claim 15, further comprising receiving a handover request message from the terminal prior to the negotiating for handover, wherein the handover request message comprises information on whether the terminal wants to perform handover using multi-carriers.

18. The method of claim 14, further comprising maintaining communication between the terminal and the serving base station while the terminal performs network reentry to the target base station based on the handover command message.

19. An apparatus for controlling the handover of a terminal in a wireless access system supporting multi-carriers, the apparatus comprising:
a transceiver unit for receiving a handover command message from a serving base station; and
a processor for performing network reentry to a target base station based on the handover command message,
wherein the handover command message received from the serving base station comprises information required for handover to the target base station and information on whether the target base station supports handover using multi-carriers and a physical carrier index of the target base station.

* * * * *